United States Patent Office.

J. BERTRAM WEBSTER, OF STOCKTON, CALIFORNIA, ASSIGNOR TO HIMSELF, W. E. GREENE, AND HENRY E. WINSLOW, OF SAME PLACE.

Letters Patent No. 92,497, dated July 13, 1869.

IMPROVED COMPOSITION FOR TOBACCO-SUBSTITUTE.

The Schedule referred to in these Letters Patent and making part of the same.

*To whom it may concern:*

Be it known that I, J. BERTRAM WEBSTER, of the city of Stockton, in the county of San Joaquin, and State of California, have invented a new and useful combination of matter to be used as a medicine to cure persons of the desire to use tobacco in any way, and especially of the desire to chew it, which I call "The Great National Tobacco Antidote."

The nature of my invention consists in providing a substance composed of medicinal properties, such that its use by persons suffering from the desire to chew or smoke tobacco of any kind, will in a short time completely kill and annihilate such desire, and afford permanent relief therefrom.

To enable others skilled in the art to make and use my invention, I will proceed to describe the nature and operation of the same.

It is wholly a vegetable substance, composed of roots, in kind and quantity, by weight, in proportions as follows, to wit:

One-half ($\frac{1}{2}$) gentian-root, (*Gentiana lutea;*) one-fourth ($\frac{1}{4}$) ginseng-root, (*Panax quinquefolium;*) one-eighth ($\frac{1}{8}$) licorice-root, (*Glycyrrhiza glabra;*) and one-eighth ($\frac{1}{8}$) seneka snake-root, (*Polygala senega;*) which being finely cut up, are mixed together thoroughly, and chewed or smoked in the same manner and in the same quantities as tobacco is chewed and smoked, and as often as the desire for chewing or smoking is experienced.

The use of the aforesaid composition by me invented, in the manner above described, will immediately allay the desire for chewing and smoking, even in cases where it has been induced by the habit of chewing and smoking for years, and in a short time effect a permanent cure.

What I claim as new, and desire to secure by Letters Patent, is—

The composition above described, for the purpose set forth.

J. BERTRAM WEBSTER.

Witnesses:
  W. E. GREIVE,
  H. E. WINSLOW,
  A. J. WEBSTER.